March 27, 1934.  B. H. JOHNSTON ET AL  1,952,673
SIGNALING MEANS FOR CASH REGISTERS AND THE LIKE
Filed May 28, 1931   4 Sheets-Sheet 1

INVENTORS
B. H. JOHNSTON AND P. MOTTERSHEAD
BY
ATTY.

March 27, 1934.  B. H. JOHNSTON ET AL  1,952,673
SIGNALING MEANS FOR CASH REGISTERS AND THE LIKE
Filed May 28, 1931  4 Sheets-Sheet 2
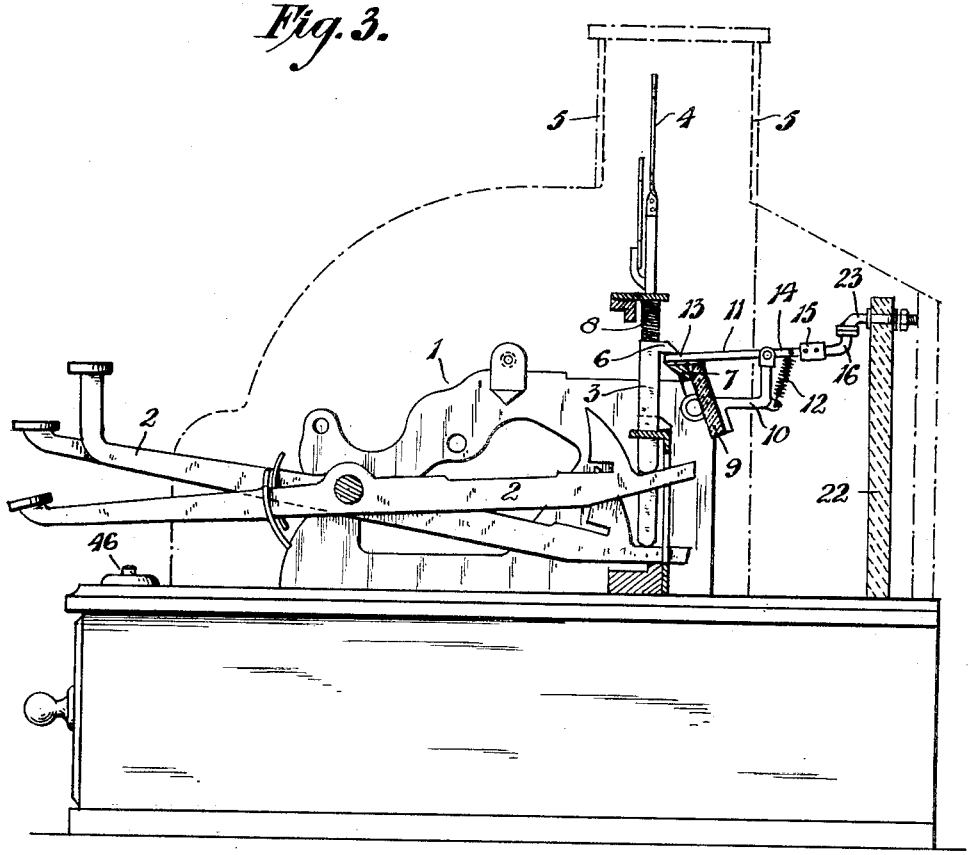
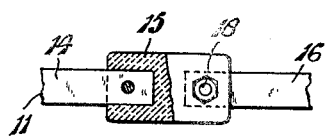
INVENTORS
B. H. JOHNSTON AND P. MOTTERSHEAD
BY
ATTY March 27, 1934.  B. H. JOHNSTON ET AL  1,952,673

SIGNALING MEANS FOR CASH REGISTERS AND THE LIKE

Filed May 28, 1931  4 Sheets-Sheet 3

INVENTORS
B. H. JOHNSTON AND P. MOTTERSHEAD
BY
ATTY.

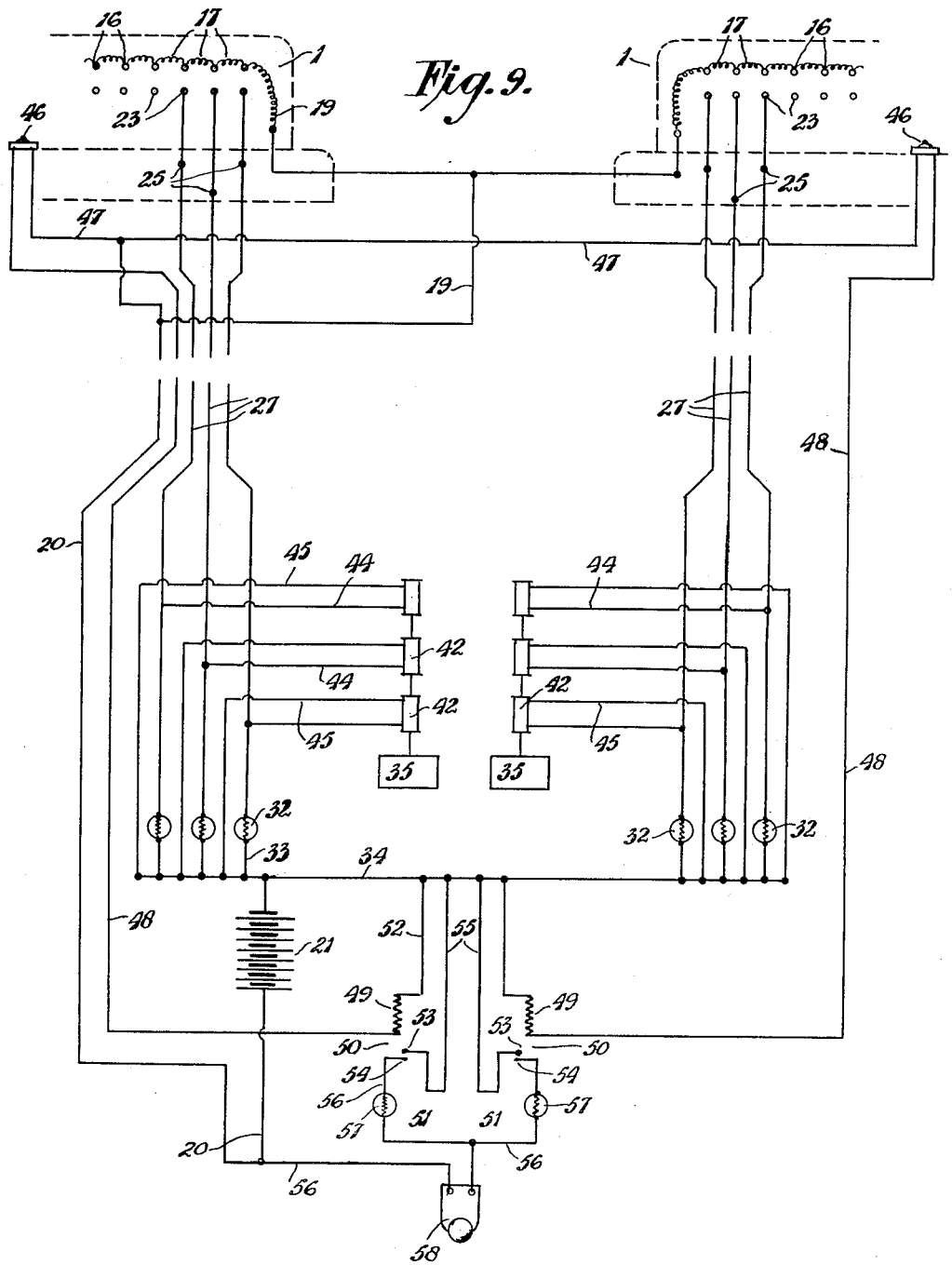

Patented Mar. 27, 1934

1,952,673

UNITED STATES PATENT OFFICE 1,952,673

SIGNALING MEANS FOR CASH REGISTERS AND THE LIKE

Bruce Hilliard Johnston and Percy Mottershead, Kensington, near Melbourne, Australia, assignors to Secret Cash Recorder Proprietary Limited, Richmond, Victoria, Australia, a company of Victoria Application May 28, 1931, Serial No. 540,770
In Australia August 1, 1930

6 Claims. (Cl. 235—23)

This invention relates to improved registering and signaling means for use in connection with cash registers and like machines.

Cash registers of present kinds are provided with mechanism for registering the total amount of money received by the machine. This registering mechanism is invariably incorporated directly within the machine and, hence, it is often possible for a fraudulent operator to tamper with the mechanism in such manner as to enable portion of the cash receipts of the machine to be embezzled. Furthermore, with such machines it is necessary to suspend the use of the machine during the time the registering mechanism is being read.

The present invention provides means whereby the actual registering of the cash receipts of a cash register or like machine is effected at a point remote from the machine such as, for instance, at the manager's or accountant's office, thus providing an effective check against embezzlement of the cash receipts of the machine, and also enabling the amount of money received by the machine to be readily ascertained at any desired time without interfering with the operation of the machine. The invention further enables the total cash receipts of a number of machines, as in one store department or throughout a whole business, to be readily calculated.

The invention also includes signaling means between the cash register machine and the remote register whereby the operator of the machine is enabled to conveniently signal for change or other requirements without leaving the machine.

The accompanying drawings illustrate the invention in one of its practical forms. In these views:—

Fig. 3 is a similar view to Fig. 1 but showing one of the keys depressed to illustrate the action of the parts.

Fig. 4 is a view of a detail.

Fig. 9 is a wiring diagram showing two cash registers connected to remote registers.

Figure 1:
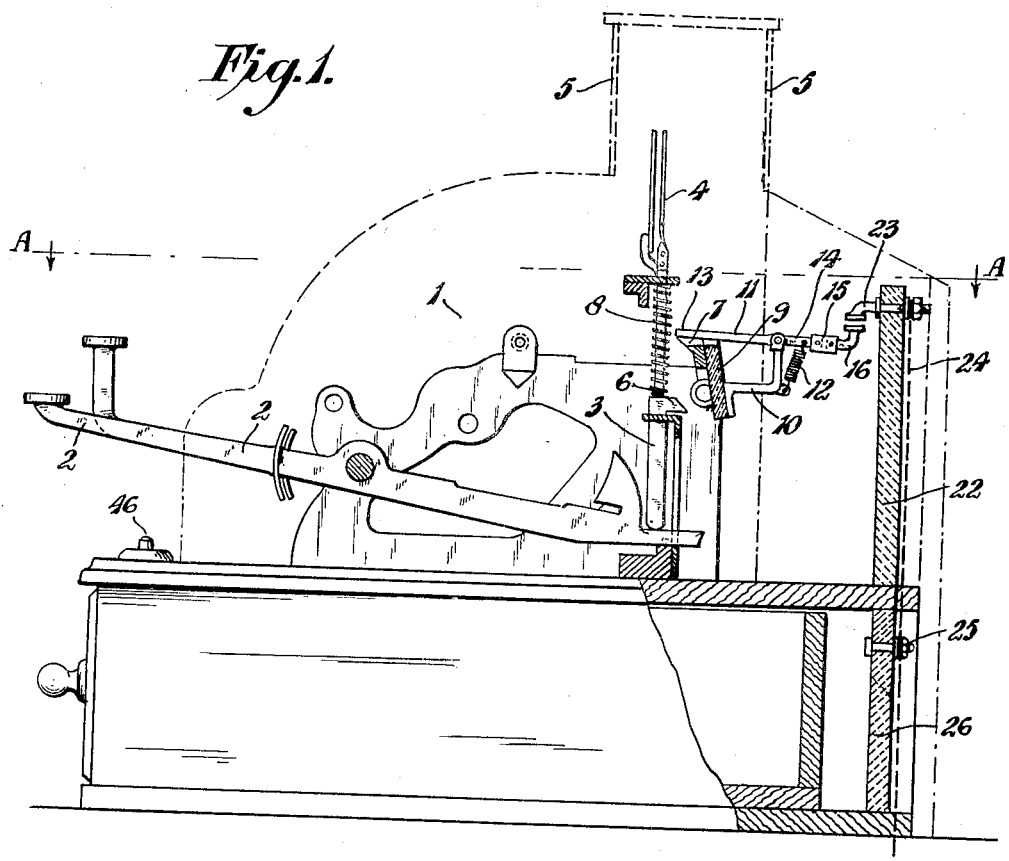
Fig. 1 is a sectional view of a cash register and associated parts in accordance with the invention.

In these views, 1 indicates a cash register which has keys 2 and other general parts of ordinary character, but has the usual registering mechanism omitted. The keys 2 actuate the lift members 3 in the usual manner to display the sales indicator plates 4 through the usual windows 5 at the upper portion of the machine. The lift members 3 have the usual catch ends 6, which are adapted to engage upon the rest bar 7 when the lift members are elevated and thus hold said members in elevated position until the rest bar 7 is actuated to release them. The usual coiled springs 8 are provided to return the lift members 3 to normal position when the rest bar 7 is released.

According to the present invention, the registering mechanism for the cash register machine, instead of being incorporated in the machine as hitherto, is positioned at a remote point such as, for instance, in the office of the manager or accountant, and the machine 1 is electrically connected thereto. Each key 2 of the machine is associated with an electric contact member so that upon the operation of any key an electric circuit is established to the remote register to cause the latter to be correspondingly actuated.

In the form of the invention illustrated in the drawings, a bar 9 of electrical insulating material is secured to the rest bar 7 and supports a plurality of brackets 10. These brackets, in turn, pivotally support levers 11 which are normally maintained in the position shown in Fig. 1 by means of coiled springs 12. The number of levers 11 corresponds to the number of keys 2 of the machine so that each key is thus adapted to actuate a separate lever.

Figure 2:
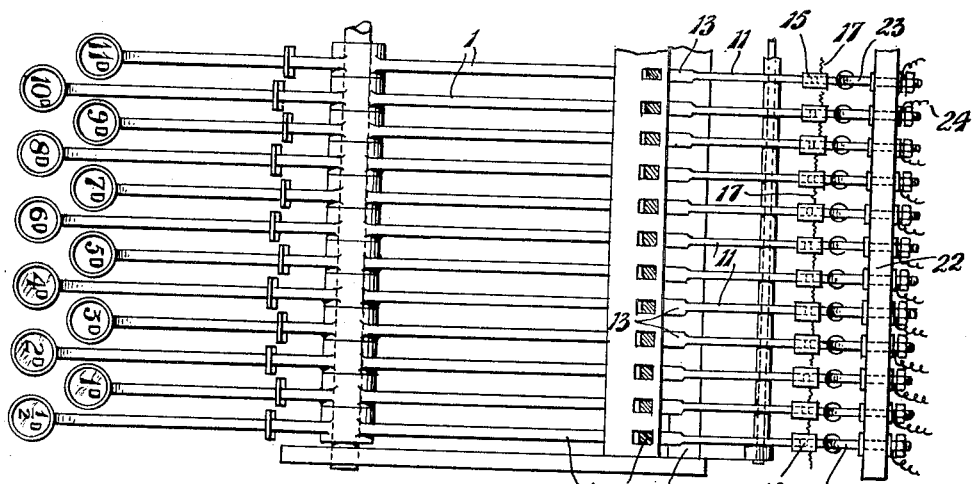
Fig. 2 is a plan view showing the keys of the cash register and the contacts operated thereby.

One end 13 of each lever 11 extends forwardly over the rest bar 7 as shown clearly in Fig. 2 so that it is operated by the catch 6 of the lift member 3 when the corresponding key 2 is actuated. The other end 14 of each lever 11 supports an insulating block 15, see Fig. 4, which in turn supports a contact 16. The block 15 serves to electrically insulate the contact 16 from the frame and mechanism of the machine. All of the contacts are coupled together in series by wires 17 connected to screws 18. The end contact 16 is in turn connected to a wire 19 which is connected to a positive wire 20 leading from a battery 21, or other suitable low voltage current supply such as, for instance, a step-down transformer. All of the contacts 16 are thus in connection with the current supply.

Provided in the back of the machine is an insulating panel 22 supporting a series of contacts 23 corresponding in number and position to the contacts 16. Said contacts 23 are connected by wires 24 to terminals 25 on an insulating terminal board 26 provided in the base of the machine.

The terminals 25 are connected by wires 27 (one for each terminal) to the remote register and indicator 28 positioned in the office of the manager or accountant or at other suitable position. The register and indicator is illustrated in Figs. 5 to 8 and comprises a casing 29 divided into a plurality of horizontal sections 30, each of which represents a different cash register machine. Each section 30 has in its front portion a series of frosted glass or like windows 31 representing the different keys of the machine and provided with signs or the like indicating the values of the particular keys. Rearwardly of the windows 31 are small electric lamps 32 connected to the wires 27 so that they are illuminated when the respective keys 2 are depressed, to thus display the signs on the windows 31. The circuit through each lamp 32 is completed by a wire 33 leading to a common negative wire 34 connected to the battery 21.

When the keys 2 of the machine are depressed to elevate the respective lift members 3, the corresponding levers 11 are operated by the catch members 6 resting upon the ends 13 of said levers. The contacts 16 and 23 are thus closed, as shown in Fig. 3, and circuits are established through the corresponding lamps 32 to thereby indicate the keys depressed and the value of the sale being effected.

Each section 30 of the register and indicator casing 29 includes a counter device 35, which is visible through a window 36 to indicate the total cash receipts of the corresponding machine 1. The counter 35 may be of any conventional type and is provided with a toothed operating wheel 37 meshing with a toothed wheel 38, which is mounted on the end of a long shaft 39, see Figs. 7 and 8. The shaft 39 supports a number of ratchet wheels 40, one for each of the machine keys 2. Pivotally mounted on the shaft 39 adjacent to each ratchet wheel 40 is a lever 41 carrying a spring-pressed pawl 42 which engages the teeth of the ratchet wheel. The outer end of each lever 41 co-acts with a solenoid 42 having a movable core 43 to actuate the lever 41.

A separate solenoid 42 is provided for each of the machine keys 2 and is connected to the respective wire 27 from the machine 1 by means of a wire 44. Each solenoid has a return wire 45 connected to the common negative wire 34. The solenoids are thus in parallel with the indicator lamps 32.

The solenoids 42 and their cores 43 are constructed in well known, conventional manner so that the movements of the various cores 43 are for different distances so that each core is adapted to transmit a different amount of movement to the shaft 39. The solenoid core corresponding to the lowest value key such as, for instance, the half-penny key, is of the shortest length so that it rotates the shaft 39 a distance sufficient to actuate the counter 35 one unit. The solenoid core representing the penny key would be sufficiently long to move the counter 35 two units, the solenoid core representing the shilling key would operate the counter twenty-four units, and so on. The various movements desired may be obtained by other means such as by using ratchet wheels of different diameters or by providing gears of different ratios between the various solenoids and the shaft 39.

When the keys 2 are depressed, the corresponding solenoids 42 are energized by current flowing through the wires 27, 44 and 45. The solenoid cores 43 are thereby actuated and motion is transmitted to the counter 35 through the ratchet mechanism 42—40 and wheels 38—37 causing said counter to be moved correspondingly to the value of the keys 2 depressed. Simultaneously, the corresponding indicator lamps 32 are illuminated to indicate the value of the sale made.

To enable the operators of the various machines 1 to signal for change or other requirements when required without leaving the machine, a press-button 46 is provided at a convenient point on each of the machines 1 and is connected by a wire 47 to the positive wire 20. From said press button a wire 48 leads to the register and indicator 28. The wire 48 is connected to the coil 49 of a relay 50 controlling a local circuit 51. From said coil a connection 52 is taken to the common negative lead 34. The local circuit 51 includes the switch points 53 and 54 which are controlled by the energization of the coil 49. One of the points 53 is connected by a wire 55 to the common negative lead 34, while the other point 54 is connected by a wire 56 to an indicator lamp 57 and a bell or buzzer 58 and thence to the battery 21.

Figure 5:
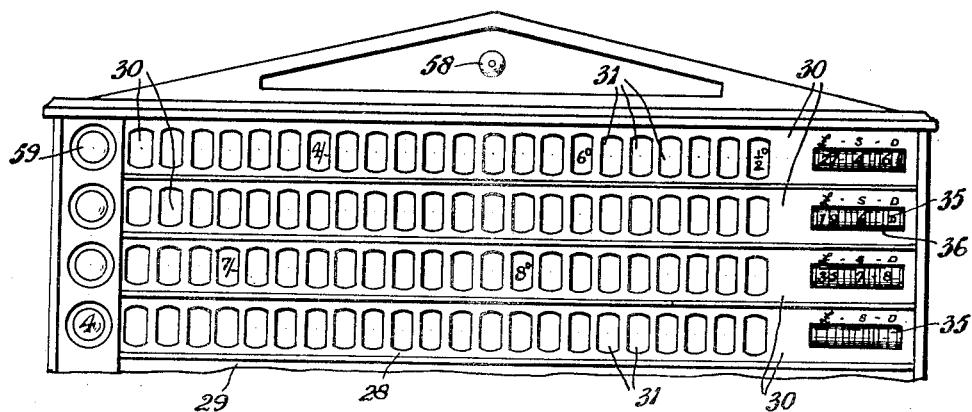
Fig. 5 is a front view.
Figure 6:
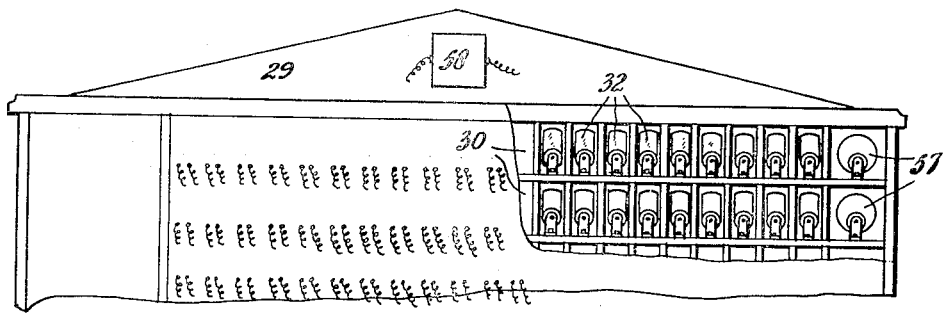
Fig. 6 is a rear view of the indicator and register positioned remote from the machine.
Figure 7:
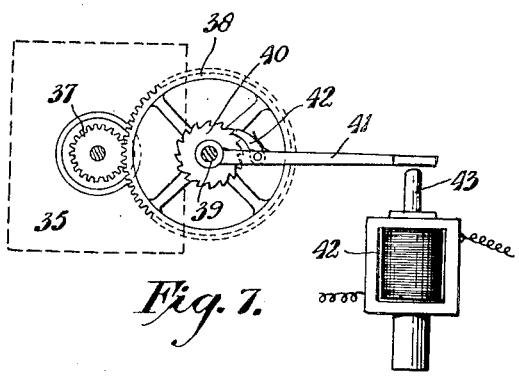
Figs. 7 and 8 are detail views of the register mechanism.
Figure 8:
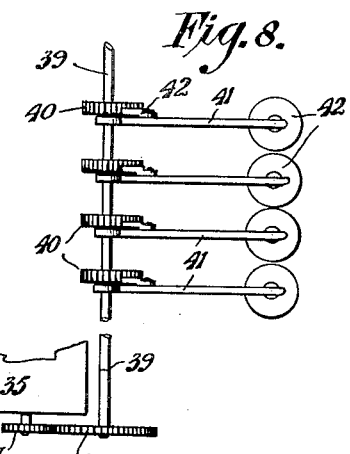

The bell or buzzer 58 is preferably positioned at the upper part of the register and indicator casing 29 as shown in Fig. 5 and is common to all of the machines 1. An indicator lamp 57 is provided for each machine and said lamps are preferably arranged at the side of the casing 29 opposite to windows 59 bearing the numbers of the particular machines.

When one of the press buttons 46 is depressed, a circuit is established through the corresponding relay, and the coil of the latter is thereby energized. The local relay circuit 51 is thus brought into use through the closing of the points 53 and 54, thus illuminating the corresponding indicator lamp 57 and operating the bell or buzzer 58. The bell or buzzer gives an audible signal to the manager, accountant or other person in authority that change is required, and the illumination of the indicator lamp indicates the particular machine requiring such change.

The front of the casing may bear suitable descriptive matter relating to the positions of the machines 1, names of departments and the like.

Two or more cash register machines 1 may be associated together as shown in Fig. 9 and their respective counters 35 mounted within the same register casing in vertical arrangement as shown in Fig. 5. This arrangement enables the total cash receipts of a number of machines such as are in one store department or throughout a whole business to be readily calculated.

By means of the invention an effective check is kept against the cash receipts of each machine and protection is thus afforded against embezzlement by the operators or salesmen. Furthermore, the manager or other person in authority is enabled at any time to obtain particulars of the cash receipts by particular departments and the like without leaving his office and without interrupting the operation of the various machines.

What we do claim is:

1. In a cash register, the combination with a registering system remote from the register, of a means for operating said system comprising fixed contact members, cooperating movable contact members, brackets secured to the register machine rest bar and pivotally supporting said movable contact members, and means cooperating with the keys of the machine for operating the movable contact members.

2. In a cash register, the combination with a registering system remote from the register, of a means for operating said system comprising a rest bar on said register, brackets secured to said bar, fixed contact members, cooperating movable contact members pivotally supported on said brackets, means for normally holding the movable contact members out of contacting position, and means cooperating with the keys of the register for moving the movable contact members into contacting position.

3. In a cash register, the combination with a registering system remote from the register, of means for operating said system comprising a rest bar on said register, brackets secured to said rest bar, fixed contact members, cooperating movable contact members pivotally supported on said brackets, slide members actuated by the register keys mounted for vertical reciprocation in the register frame, said slide member engaging the movable contact members and moving them to contacting position.

4. In a cash register, the combination with a registering system remote from the register, of means for operating said systems comprising an insulating panel, a plurality of stationary contact members carried by said panel, a rest bar in said register, brackets secured to the rest bar, levers pivotally supported by said brackets, a contact member carried at one end of each of said levers, the other ends of the levers being upheld by the rest bar, means for normally holding the contact members on the pivoted levers out of engagement with the stationary contact members, and means operated by the keys of the register for moving said lever contact members into contact with the stationary contact members.

5. The combination as set forth in claim 4, wherein an insulated block is interposed between the brackets and the rest bar, and an insulated connection between the movable contact members and the levers on which they are carried.

6. In a cash register, the combination with a registering system remote from the register, of a means for operating said system comprising an insulating plate, a plurality of stationary contacts carried by said plate, a rest bar, an insulating bar secured to the rest bar, brackets secured to the insulating bar, levers pivotally mounted on said brackets, a contact member carried at one end of each of the levers, the other ends of the levers projecting slightly beyond and upheld by the rest bar, a spring connected to each lever and normally holding the lever-carried contact from contacting with the stationary contact, slide members carried by the frame of the register for vertical reciprocation, register keys operating said slide members whereby said slide members strike the pivoted levers to move the lever-carried contacts into contacting position.

BRUCE HILLIARD JOHNSTON.
PERCY MOTTERSHEAD.